Aug. 21, 1962
K. SPARKUHL
3,049,918
FLUID FLOWMETERS
Filed March 11, 1960
2 Sheets-Sheet 1
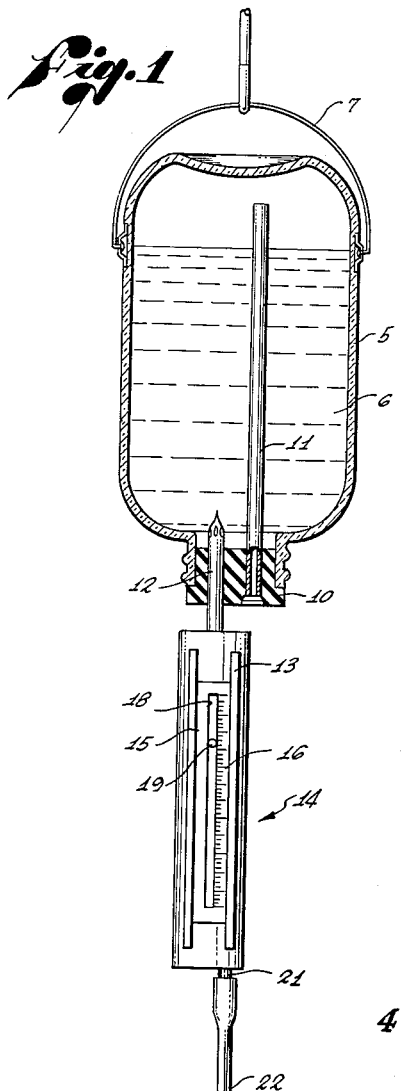
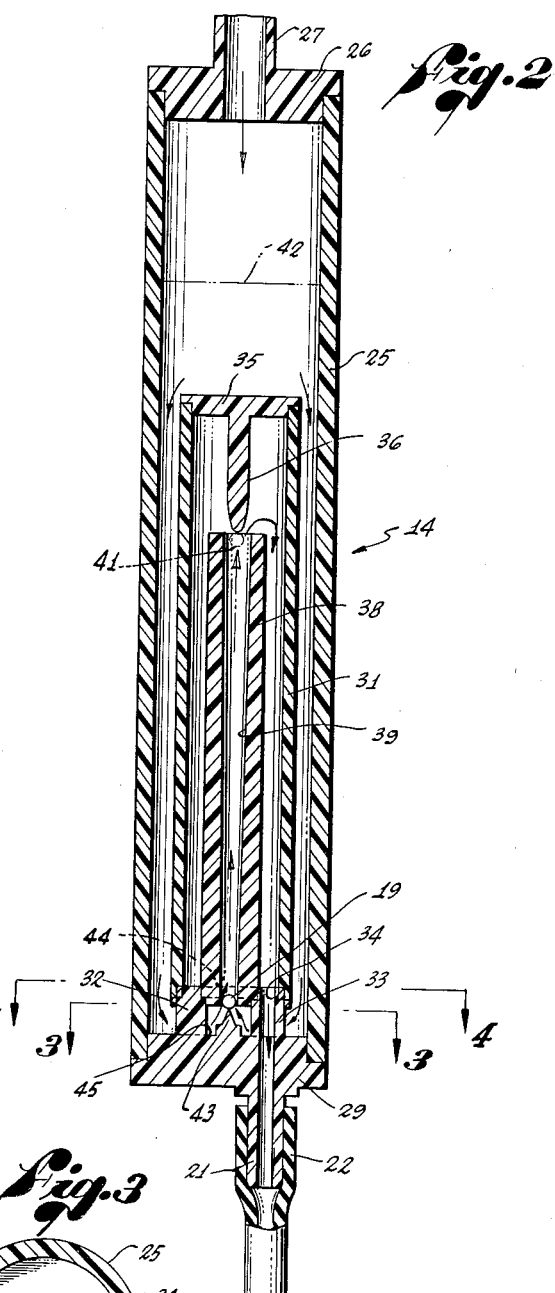
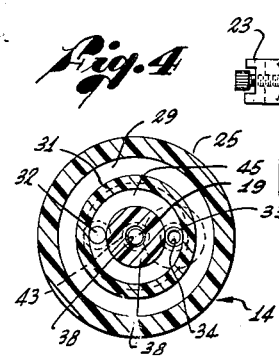
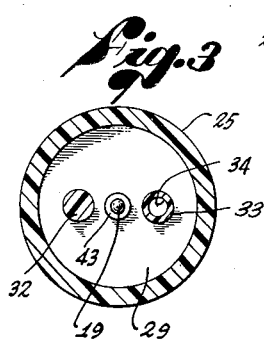
INVENTOR.
KONSTANTIN SPARKUHL
BY
Attorney Aug. 21, 1962  K. SPARKUHL  3,049,918
FLUID FLOWMETERS
Filed March 11, 1960  2 Sheets-Sheet 2
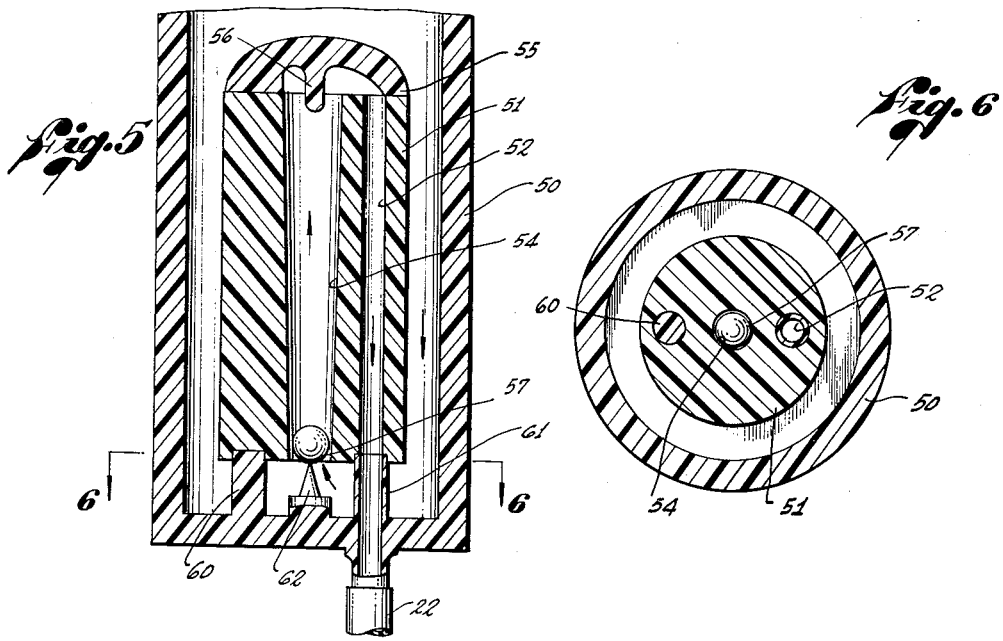
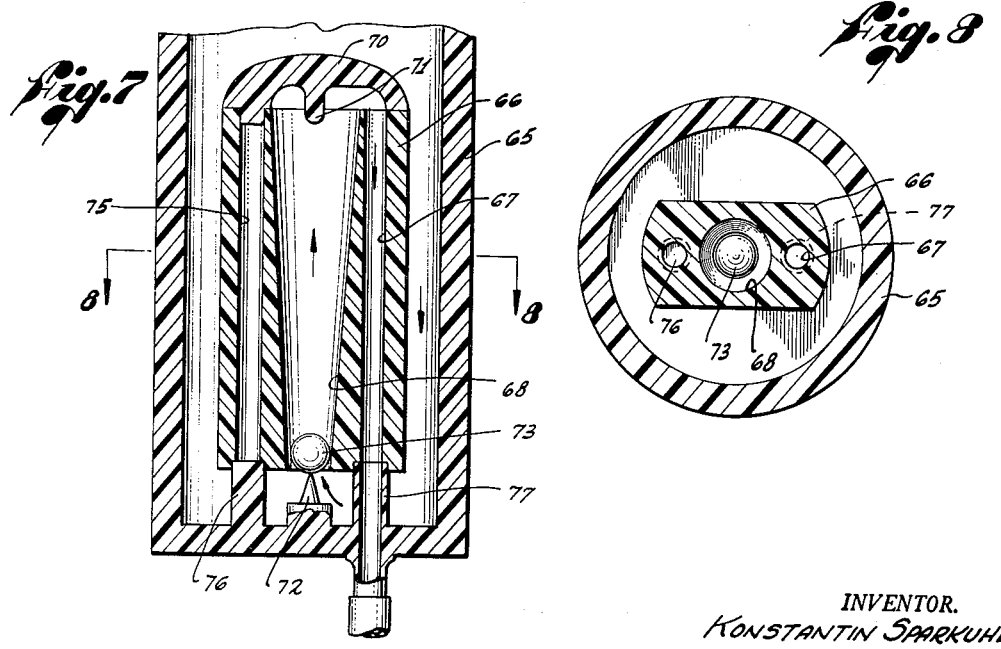
INVENTOR.
KONSTANTIN SPARKUHL
BY
ATTORNEY

United States Patent Office 3,049,918
Patented Aug. 21, 1962

3,049,918
FLUID FLOWMETERS
Konstantin Sparkuhl, San Marino, Calif., assignor of fifty percent to Theodore Gregory, Studio City, Calif.
Filed Mar. 11, 1960, Ser. No. 14,260
4 Claims. (Cl. 73—209)

This invention relates to a device for measuring the rate of flow of fluids, and particularly to a flowmeter for measuring liquids intravenously administered to a patient.

Certain prior types of flowmeters eliminate any counting of the drops of liquid or measuring integrating meters and directly indicate on a scale the amount of liquid flowing to a patient at any instance. The scales are preferably calibrated in cubic centimeters or millimeters per hour or per minute so that it is only necessary to observe the scale for an accurate reading of the rate of flow of the intravenous fluid. The units are self-adjusting to the extent that upon stoppage of the liquid flow, the meter will read zero. Another scale reading drops per minute may be used alone or placed alongside of the precalibrated scale.

The present invention has all the advantages of the prior types of flowmeters, plus a number of additional advantages. For instance, the flowmeter described hereinafter is constructed of coaxial, nested members, preferably tubular, and is adapted to hang erectly in balance and in a manner enabling it to be easily read from any side. In its preferred embodiment, it is concentrated into a small concentric unit made up of coaxial tubes and chambers, which arrangement not only contributes to the erect hangling balance of the unit but also enables wall structure of a nature eliminating stresses and strains which might otherwise prevail when the device is made of plastic material.

The rate of flow is indicated by the position of a ball in a tapered bore of one of the tubes, the ball moving along a scale calibrated in cubic centimeters or millimeters per hour or per minute or in drops of fluid per minute. The erect, hanging balance contributes to the proper operation of this ball since it eliminates a tendency, which might otherwise prevail, for the ball to shift off-center within the tapered bore. The device may not only be made small physically but is unusually free from failure and thus particularly reliable in its operation. It is also economical to manufacture, so it can be disposable; that is, used only once and then discarded, thus providing the maximum in sterility.

The principal object of the invention, therefore, is to facilitate the indicator of the rate of flow of a fluid.

Another object of the invention is to provide an improved flowmeter for measuring the rate of flow of intravenous fluids.

A further object of the invention is to provide an improved flowmeter for directly indicating the rate of flow of intravenous fluids and which is a minimum size physically, economical to produce, and is reliable in operation.

A better understanding of the invention may be had from the following description when read in connection with the accompanying drawings, in which:

FIG. 1 is an elevational view, partly in cross section, showing a flowmeter embodying the invention;

FIG. 2 is an elevational cross-sectional view of the flowmeter shown in FIG. 1;

FIG. 3 is a cross-sectional view taken along the line 3—3 of FIG. 2;

FIG. 4 is a cross-sectional view taken along the line 4—4 of FIG. 2;

FIG. 5 is a partial elevational cross-sectional view of a modification of the invention shown in FIGS. 1 to 4, inclusive;

FIG. 6 is a cross-sectional view taken along the line 6—6 of FIG. 5;

FIG. 7 is a partial elevational cross-sectional view of a modification of the invention shown in FIGS. 1 to 4, inclusive; and FIG. 8 is a cross-sectional view taken along the line 8—8 of FIG. 7.

Referring now, to the drawings in which the same reference numerals indicate like elements, a supply bottle 5 containing a fluid 6 may be suspended in any suitable manner, such as by a bale 7. The mouth of the bottle has a stopper 10 therein through which is an air vent pipe 11 extending above the surface of the fluid 6. Also in stopper 10 is an outlet tube 12 having a spiked top. The tube 12 may extend into the upper end of the flowmeter shown generally at 14 or may be an integral part of the flowmeter. There is mounted on the flowmeter a holder 13 for a scale card 15 having calibrated indicia 16 thereon, this indicia being properly calibrated, such as in cubic centimeters or millimeters per hour or per minute or in number of drops per minute.

Visible through an elongated slot 18 in the scale card is a ball indicator 19, the position of which indicates the rate of flow as read on the indicia 16. From the bottom of the flowmeter 14 through a connecting stem 21 is a flexible tube 22 having a valve 23 thereon to control the fluid flow from the bottle 5.

Referring, now, to FIGS. 2, 3, and 4, the flowmeter 14 is constructed of an outer tube or cylinder 25, which may be of transparent material, such as plastic or glass, and which is closed at the top by a cap 26 having a hollow inlet stem 27. The cap 26 could be formed integrally with the cylinder 25. The lower end of the flowmeter is closed by a cap 29 in which is the stem 21 connected to the tube 22. The cap 29 has two bosses 32 and 33 extending upwardly therefrom, boss 33 having a bore 34 which extends through stem 21.

Coaxially positioned within the cylinder 25 is a second tube or cylinder 31 shorter than tube 25 and which is attached to the bosses 32 and 33 on the cap 29. This second cylinder is also transparent and may be of glass or plastic. The top of the cylinder 31 is closed by a cap 35 having a central pointed extension 36.

Coaxially positioned within the second cylinder 31 is an inner third tube or cylinder 38, which is transparent and may be of glass or plastic. The internal bore 39 of this inner cylinder is tapered from a narrow dimension at the bottom to a wider dimension at the top and in which is positioned the ball 19 shown at the bottom of the cylinder 39 which indicates zero flow of fluid through the bore in the direction shown by the arrows. The end of the extension 36 is positioned slightly within the upper end of the tapered bore of cylinder 38 to maintain the ball 19 therein, as shown by the dotted lines 41. A tapered stud 43 under the ball 19 establishes the zero position of the ball and prevents the ball from dropping to a level where it will stick in the bore 39 in the event the lower end of the bore is too small. As shown by the dotted lines 44 in FIG. 2, a horizontal wall 45 is positioned at the bottom of the tubes 31 and 38, through which wall the bosses 32 and 33 extend, the bore 34 in boss 33 communicating with the space between cylinders 31 and 38. The wall 45 may be either integral with these tubes or may be a separate washer which fills the space between the tubes 31 and 38 except at bore 34. (See FIGS. 3 and 4.)

In the operation of the above-described flowmeter, the fluid enters through the stem 27 of the cap 26 and flows into the chamber formed by the wall of the outer cylinder or tube 25. The fluid then flows between the wall of the second cylinder 31 and the wall of the cylinder 25 and across the bottom of the cap 29 around bosses 32 and 33 and then upwardly into the tapered bore of the inner tube 38. It then passes out of the upper end of the tube 38 and downwardly between the wall of the tube 38 and the wall of the second tube 31 and out through the bore 34 into the tube 22. The rate of flow is controlled by the valve 23, and the indication of this rate of flow is shown by the position of the ball 19 in the tube 38, the maximum rate of flow bringing the ball to the top of the tapered bore in the tube 38. The rate of flow is read on the indicia scale. The ball 19 is made of a material whose specific gravity is greater than that of the fluid being metered; for instance, in metering certain fluids, it may be made of glass or plastic. To illustrate a preferred flowmeter, the tapered tube 38 may have the following dimensions:

|  | Inches |
|---|---|
| Length of bore 39 | 1.875 |
| Large diameter of bore 39 | .085 |
| Small diameter of bore 39 | .066 |
| Diameter of ball 19 | .0625 |

With these dimensions, there will be no tendency for the ball to stick in the lower end of the bore, the stud 43 serving only to hold the ball from dropping out and to establish the zero position of the ball.

Referring, now, to FIGS. 5 and 6, this flowmeter construction comprises a cylindrical outer tube 50, which may be of transparent glass or plastic, and an inner transparent cylinder 51 having a constant diameter bore 52 therethrough and offset from the center thereof, and a tapered central bore 54 therethrough. The top of the inner cylinder 51 is closed by a cap 55, providing communication between bores 52 and 54 and has a central extension 56 to maintain a ball 57 within the tapered bore 54 when it reaches the top of the tapered bore. The cylinder 50 may be capped as shown at 26 in FIG. 2. The inner cylinder 51 is mounted on bosses 60 and 61, boss 61 having a through-bore connecting with the bore of tube 22. A tapered stud 62 is provided for determining the zero position of the ball 57. This modification functions in the same manner as the modification shown in FIGS. 1 to 4, inclusive, the fluid entering the cylinder 50 and flowing between this cylinder and the outer surface of the cylinder 51, then up the tapered bore 54 and out through bore 52 to the exit tube 22 as shown by the arrows.

Referring, now, to FIGS. 7 and 8, a flowmeter construction similar to that shown in FIGS. 5 and 6 includes an outer cylinder 65 and an inner element 66 of approximately rectangular, transverse cross-section and having a bore 67 therein at one side and a centrally tapered bore 68. The inner element 66 is closed at the top by a cap 70 to provide communication between bores 67 and 68, and has a projection 71 at the center thereof to prevent the ball from leaving the bore 68. The cylinder 65 may be closed at the top as shown at 26 in FIG. 2. A bore 75, plugged at its opposite ends, may or may not be provided at the other side of element 66, this bore serving to give symmetry and balance to element 66; the character of symmetry reducing stresses and strains that might otherwise exist, particularly if element 66 be a plastic molding or extrusion.

In this modification of FIGS. 7 and 8, the fluid enters the flowmeter between the inner surface of the cylinder 65 and the outer surface of the element 66 and flows to the lower end of the tapered bore 68 and out through the bore 67, as shown by the arrows. A tapered stud 72 is provided to determine the zero position of a ball 73. The element 66 is supported on bosses 76 and 77, boss 76 closing the lower end of bore 75 and boss 77 having a bore therethrough for the exit of the fluid as described above for the other modifications.

It will be noted that all the flowmeters operate on the same general principle and are balanced to provide the advantages mentioned above. Furthermore, the flowmeters may be of small proportions and are so economical to manufacture that they can be disposable after a single use. They are easily supported on an outlet tube, such as 12, held in the stopper 10 by friction. To start the flowmeters, the valve 23 is opened and flow is permitted until the tube 22 is full. The tube 22 is then raised above the flowmeter to flow the fluid back into the flowmeter up to a level above the top of inner cylinders, such as shown by line 42 in FIG. 2. This eliminates any air in the flowmeters, after which the rate of flow is indicated by the position on the balls in the tapered bores.

I claim:

1. A flowmeter comprising three vertically and co-axially positioned cylinders, one of which has a tapered bore, fluid being adapted to first flow downwardly through said flowmeter, then upwardly in said tapered bore and then downwardly to exit from said cylinders, said cylinders including a first outer cylinder, a second cylinder within said first cylinder and closed at the top, and an inner cylinder having said tapered bore therein, said fluid first flowing downwardly between said second cylinder and said first cylinder, then upwardly through said tapered bore, and then downwardly between said second cylinder and said inner cylinder, said tapered bore in said inner cylinder having means therein for indicating the amount of fluid flowing therethrough, a base being provided for said first cylinder, said base being provided with a pair of bosses, a wall mounted on said bosses and spaced from the inner surface of said base, the ends of said second and inner cylinders being connected to said wall to provide a passage from the space between said first and second cylinders to said tapered bore.

2. A flowmeter in accordance with claim 1 in which a tapered stud is positioned on the inner surface of said base, said stud having the apex thereof extending into said tapered bore to position said indicating means at zero flow position.

3. A flowmeter in accordance with claim 2 in which a cap is provided for the upper end of said second cylinder, said cap having a central extension with the end thereof extending into the upper end of said inner cylinder to maintain said indicating means within said tapered bore.

4. A flowmeter in accordance with claim 3 in which one of said bosses has a bore therein communicating with the space between said inner and second cylinders to carry fluid from said meter.

References Cited in the file of this patent

UNITED STATES PATENTS

| 2,023,008 | Deming | Dec. 3, 1935 |
| 2,087,279 | Deming | July 20, 1937 |
| 2,258,023 | McKernon | Oct. 7, 1941 |
| 2,655,041 | Jacobson | Oct. 13, 1953 |
| 2,993,374 | Dwyer et al. | July 25, 1961 |